United States Patent

Shimizu (10) Patent No.: US 9,432,580 B2
(45) Date of Patent: Aug. 30, 2016

(54) CAMERA MODULE HAVING ANTI-SHAKE MECHANISM

(71) Applicant: FUJIFILM Corporation, Tokyo (JP)

(72) Inventor: Motokazu Shimizu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 1 day.

(21) Appl. No.: 14/696,492

(22) Filed: Apr. 27, 2015

(65) Prior Publication Data

US 2015/0229843 A1 Aug. 13, 2015

Related U.S. Application Data

(63) Continuation of application No. PCT/JP2013/078281, filed on Oct. 18, 2013.

(30) Foreign Application Priority Data

Oct. 31, 2012 (JP) ................. 2012-241240

(51) Int. Cl.
    *H04N 5/232* (2006.01)
    *G03B 5/00* (2006.01)
    *G02B 13/00* (2006.01)
    *H04N 5/225* (2006.01)

(52) U.S. Cl.
    CPC ...... *H04N 5/23287* (2013.01); *G02B 13/0015* (2013.01); *G03B 5/00* (2013.01); *H04N 5/2254* (2013.01); *H04N 5/2328* (2013.01); *H04N 5/23248* (2013.01); *H04N 5/23258* (2013.01); *G03B 2205/0015* (2013.01); *G03B 2217/005* (2013.01)

(58) Field of Classification Search
    CPC .................................................. H04N 5/2253
    USPC ....................................................... 348/374
    See application file for complete search history.

(56) References Cited

U.S. PATENT DOCUMENTS

| | | | |
|---|---|---|---|
| 7,576,778 B2 | 8/2009 | Hirota | |
| 7,864,245 B2* | 1/2011 | Yoon | H04N 5/2253 348/340 |
| 8,406,617 B2 | 3/2013 | Yanagisawa | |
| 2006/0055787 A1* | 3/2006 | Hirota | G03B 5/00 348/208.5 |
| 2006/0062100 A1* | 3/2006 | Takahashi | H04N 5/2254 369/44.11 |
| 2006/0239671 A1* | 10/2006 | Shiraishi | H04N 5/2254 396/89 |
| 2007/0201848 A1* | 8/2007 | Taguchi | G03B 5/02 396/55 |

(Continued)

FOREIGN PATENT DOCUMENTS

| | | |
|---|---|---|
| JP | 2004-129283 | 4/2004 |
| JP | 2006-081006 | 3/2006 |

(Continued)

*Primary Examiner* — Roberto Velez
*Assistant Examiner* — Cynthia Segura
(74) *Attorney, Agent, or Firm* — Jianq Chyun IP Office (57) ABSTRACT

In a camera module for portable electronic equipment, a board holder includes a holder body extending transversely with an optical axis direction, and two support devices extending in the optical axis direction. A main circuit board (first circuit board) of a wiring board device with a flexible wiring board is supported on a rear surface of the holder body. A sub circuit board (second circuit board) is supported by the support devices. An image sensor for imaging and a signal processor are mounted on the main circuit board. An angle sensor, a controller and a driver are mounted on the sub circuit board. Thus, it is possible stably to position the angle sensor and to construct the camera module with a reduced size.

16 Claims, 6 Drawing Sheets

(56) References Cited

U.S. PATENT DOCUMENTS

2011/0103782 A1* 5/2011 Tsuruta .................. G02B 7/022
      396/55
2016/0047675 A1* 2/2016 Tanenhaus ................ G01P 3/00
      702/104

FOREIGN PATENT DOCUMENTS

| | | |
|---|---|---|
| JP | 2007-052358 | 3/2007 |
| JP | 2010-107788 | 5/2010 |
| JP | 2010-250045 | 11/2010 |
| JP | 2011-133792 | 7/2011 |

* cited by examiner

CAMERA MODULE HAVING ANTI-SHAKE MECHANISM

CROSS-REFERENCE TO RELATED APPLICATION

This application is a Continuation of PCT International Application PCT/JP2013/078281 filed on 18 Oct. 2013, which claims priority under 35 USC 119(a) from Japanese Patent Application No. 2012-241240 filed on 31 Oct. 2012. The above application is hereby expressly incorporated by reference, in its entirety, into the present application.

BACKGROUND OF THE INVENTION

1. Field of the Invention

The present invention relates to a camera module having an anti-shake mechanism. More particularly, the present invention relates to a camera module having an anti-shake mechanism, in which an angle sensor can be positioned stably and a camera can have a sufficiently reduced size.

2. Description Related to the Prior Art

Portable electronic equipment, for example, a mobile telephone or portable information terminal device, having a function of a camera is widely used. A camera module for this purpose is a unit including lens optics and an image sensor, and incorporated in the portable electronic equipment in a suitable position.

For the purpose of obtaining high portability of the camera module, reduction of the weight and size of the camera module is generally more important than for a compact camera. Also, a high number of pixels in the image sensor and high resolution of the lens optics are important factors in order to form an image of a high image quality. Furthermore, there are known type of the camera module having an auto focus device (AF device) and/or an anti-shake device. The auto focus device automatically adjusts focus in order to obtain an image sharply even with simple manipulation. The anti-shake device functions to remove influence of a camera shake in the manual operation of a user's hands.

For the structure with the auto focus device and/or the anti-shake device, various components are required, including an auto focus mechanism (AF mechanism) and/or anti-shake mechanism, an angle sensor, controller, driver, and a flexible wiring board. The auto focus mechanism and/or the anti-shake mechanism moves the entirety or part of the lens optics. The angle sensor detects a camera shake. The controller and driver cooperate for driving an actuator in the auto focus mechanism or the anti-shake mechanism. The flexible wiring board interconnects those circuits and the angle sensor. However, there arises a problem of enlarging the size of the camera module due to an increase in the number of the components.

U.S. Pat. No. 8,406,617 (corresponding to JP-A 2010-250045) discloses the camera module having a digital imager or camera (module main body), a front cover and the flexible wiring board, in a form with a reduced size. The digital imager is in a block shape. The front cover covers a front side of the digital imager. Two bend portions are formed with the flexible wiring board in an L-shape. A gyrosensor (angle sensor) for an X direction and a driver IC are mounted on a first one of the bend portions. The gyrosensor for a Y direction and a control IC are mounted on a second one of the bend portions. The bend portions are directed in parallel with an optical axis direction of the lens optics. The gyrosensors, the driver IC and the control IC are arranged in spaces between the digital imager and the front cover.

In U.S. Pat. No. 8,406,617, the bend portions are disposed in the space between the digital imager and the front cover. Tilt or shift of the bend portions is likely to occur incidentally. The gyrosensors is also tilted, so that the axis of the gyrosensors cannot be kept in parallel with the optical axis direction. Precision in the shake correction will be low, as detection of an amount of the camera shake may be incorrect. There is no known type of the camera module in which the angle sensor is positioned stably for high precision in the shake correction, and which has a sufficiently reduced size.

SUMMARY OF THE INVENTION

In view of the foregoing problems, an object of the present invention is to provide a camera module having an anti-shake mechanism, in which an angle sensor can be positioned stably and a camera can have a sufficiently reduced size.

In order to achieve the above and other objects and advantages of this invention, a camera module includes a lens structure, having lens optics, for focusing object light from an object. An image sensor detects the object light from the lens optics, to photograph an image. An anti-shake mechanism corrects a camera shake by moving the lens structure two-dimensionally in a plane perpendicular to an optical axis direction of the lens optics. A first circuit board has the image sensor mounted thereon, and is electrically connected with the anti-shake mechanism. An angle sensor detects the camera shake. A second circuit board is connected with the first circuit board, and has the angle sensor mounted thereon. A holder body supports the first circuit board in a plane perpendicular to the optical axis direction. Two support devices are disposed to extend from the holder body in the optical axis direction, for supporting edges of the second circuit board on a lateral side of the lens structure. A first crossbar portion is disposed to extend between front end portions of the two support devices, for supporting a front portion of the second circuit board.

Preferably, furthermore, a second crossbar portion is disposed to extend between intermediate portions of the two support devices, for supporting an intermediate portion of the second circuit board.

Preferably, the second circuit board includes a driver for transmitting a drive signal to the anti-shake mechanism.

Preferably, the holder body has a rear surface where the first circuit board is supported. Furthermore, an exposure opening is formed in the holder body, for entry of the object light to the image sensor.

Preferably, furthermore, a glass cover covers the exposure opening.

Preferably, the first circuit board is coupled with an intermediate portion of a flexible wiring board, and the second circuit board is coupled with a distal end portion of the flexible wiring board, to constitute a wiring board device.

Preferably, furthermore, a connecting board is disposed along the first circuit board, having a contact connected with the first circuit board, for electric connection between the anti-shake mechanism and the first circuit board. A test pad structure is formed on the connecting board, connectable with a testing apparatus, for testing the anti-shake mechanism.

Preferably, the lens structure, the anti-shake mechanism and the connecting board constitute a lens unit. The holder body and the first and second circuit boards constitute an imaging unit, and the lens unit is mounted on the imaging unit.

Preferably, furthermore, a light-tight housing of a box shape contains the lens unit and the imaging unit at least partially, wherein the second circuit board and the test pad structure are disposed on a periphery of the light-tight housing. A lens opening is formed in the light-tight housing and aligned with the lens optics.

Preferably, furthermore, a front cover covers the light-tight housing, the second circuit board and the test pad structure. An opening is formed in the front cover, for passing the object light to the lens optics.

Preferably, the angle sensor includes a three-axis gyrosensor, having three rotational axes perpendicular to each other, wherein one of the rotational axes being aligned with the optical axis direction, the three-axis gyrosensor detecting movement in directions of two of the rotational axes perpendicular to the optical axis direction.

Also, a camera module includes a lens structure, having lens optics, for focusing object light from an object. An image sensor detects the object light from the lens optics, to photograph an image. An anti-shake mechanism corrects a camera shake by moving the lens structure two-dimensionally in a plane perpendicular to an optical axis direction of the lens optics. A first circuit board has the image sensor mounted thereon, and is electrically connected with the anti-shake mechanism. An angle sensor detects the camera shake. A second circuit board is connected with the first circuit board, and has the angle sensor mounted thereon. A holder supports the first circuit board in a plane perpendicular to the optical axis direction, and supports the second circuit board along the optical axis direction on a lateral side of the lens structure. A flexible wiring board has an intermediate portion with which the first circuit board is coupled, has a distal end portion with which the second circuit board is coupled, for constituting a wiring board device. A connecting board is disposed along the first circuit board, has a contact connected with the first circuit board, for electric connection between the anti-shake mechanism and the first circuit board. A test pad structure is formed on the connecting board, connectable with a testing apparatus, for testing the anti-shake mechanism.

Preferably, the lens structure, the anti-shake mechanism and the connecting board constitute a lens unit. The holder and the first and second circuit boards constitute an imaging unit, and the lens unit is mounted on the imaging unit.

Preferably, furthermore, a light-tight housing of a box shape contains the lens unit and the imaging unit at least partially, wherein the second circuit board and the test pad structure are disposed on a periphery of the light-tight housing. A lens opening is formed in the light-tight housing and aligned with the lens optics.

Preferably, furthermore, a front cover covers the light-tight housing, the second circuit board and the test pad structure. An opening is formed in the front cover, for passing the object light to the lens optics.

Preferably, the angle sensor includes a three-axis gyrosensor, having three rotational axes perpendicular to each other, wherein one of the rotational axes being aligned with the optical axis direction, the three-axis gyrosensor detecting movement in directions of two of the rotational axes perpendicular to the optical axis direction.

Consequently, an angle sensor can be positioned stably and a camera can have a sufficiently reduced size, because a holder body in the camera module can function to support the first circuit board and support the second circuit board with the angle sensor in a discrete manner from the first circuit board.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
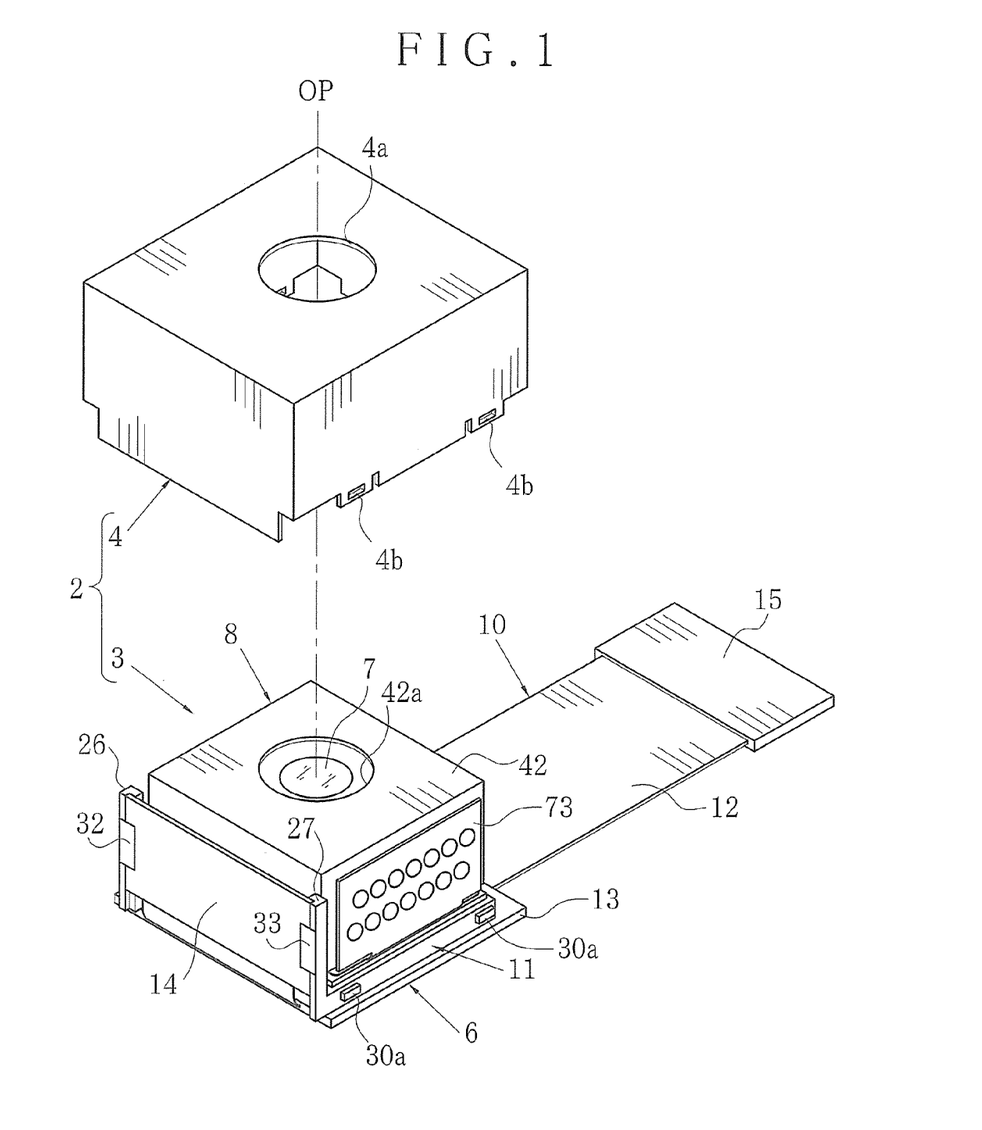
FIG. 1 is an exploded perspective view illustrating a camera module in a state of removing a cover.

In FIG. 1, a camera module 2 or camera apparatus includes a digital imager 3 or camera (module main body), and a front cover 4 (outer cover) for covering a front side of the digital imager 3. The camera module 2 is mounted in portable electronic equipment (not shown), such as a mobile telephone. The digital imager 3 includes an imaging unit 6 and a lens unit 8 (lens system). An image sensor 5 of FIG. 2 for imaging is incorporated in the imaging unit 6. Lens optics 7 (lens system) for imaging are provided in the lens unit 8. The front cover 4 is in a box shape with a rear opening. A circular opening 4a is formed in a front wall of the front cover 4 for introducing object light. Two coupling holes 4b are formed in a first rear edge portion of the front cover 4 for engagement with the digital imager 3. Also, two coupling holes are formed in a second rear edge portion (not shown) of the front cover 4. A front side of the front cover 4 is directed to an object. A side of the image sensor 5 is a rear side. However, the front cover 4 in the drawing is directed upwards, the image sensor 5 being directed downwards.

Figure 2:
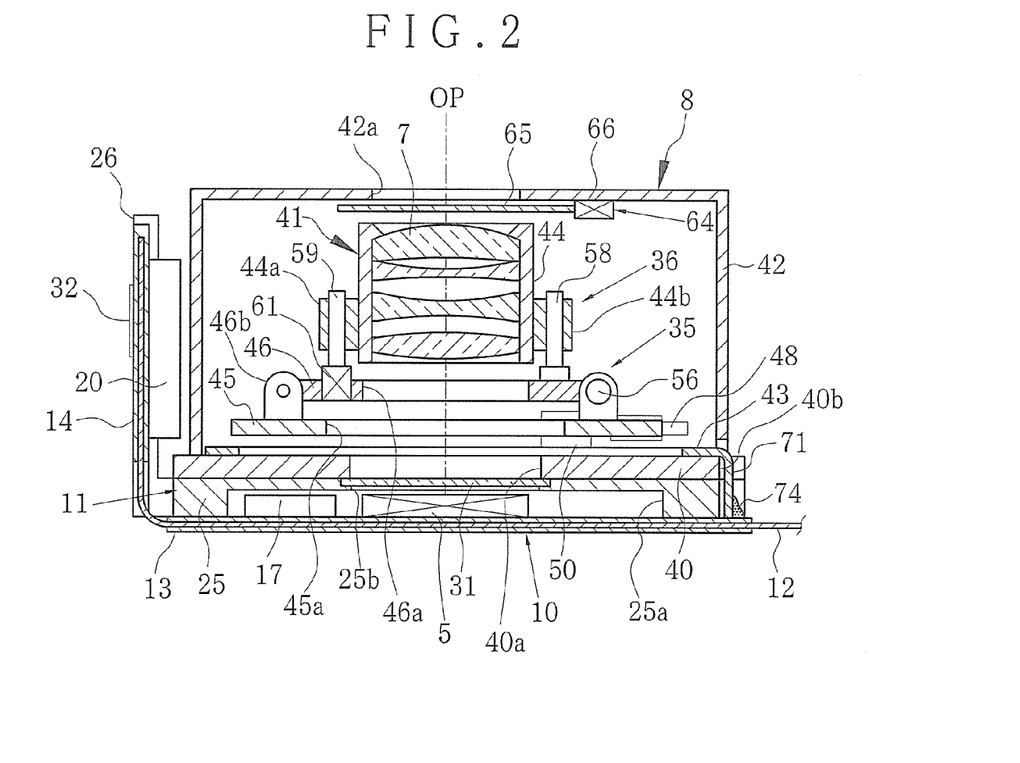
FIG. 2 is a cross section illustrating a digital imager in the camera module.
Figure 3:
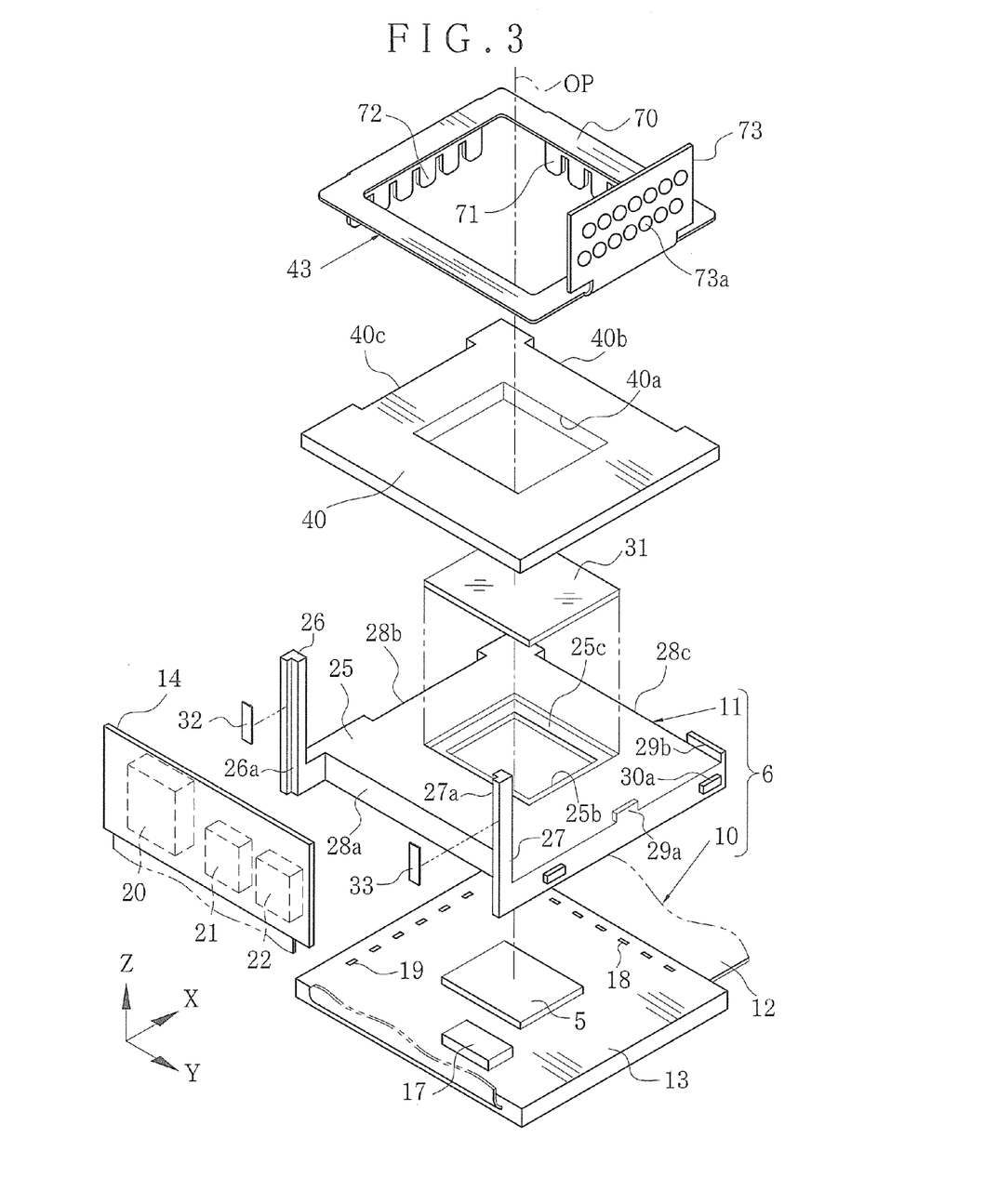
FIG. 3 is an exploded perspective view illustrating an imaging unit.

In FIGS. 2 and 3, the imaging unit 6 includes a wiring board device 10 with a flexible wiring board, and a board holder 11 for supporting the wiring board device 10. The wiring board device 10 includes a flexible wiring board 12 of a long shape, a main circuit board 13 (first circuit board), a sub circuit board 14 (second circuit board) and a connection terminal 15 or array of terminals. The sub circuit board 14 and the connection terminal 15 are so disposed that the flexible wiring board 12 extends between those. The main circuit board 13 is coupled with an intermediate portion on the flexible wiring board 12. The main and sub circuit boards 13 and 14 and the connection terminal 15 are electrically connected by the flexible wiring board 12. Those parts of a plate shape includes a portion of the flexible wiring board 12 and hard resin layers, for example, epoxy resin, for sandwiching the portion of the flexible wiring board 12.

The image sensor 5 and a signal processor 17 are mounted on the main circuit board 13. Contact groups 18 and 19 are disposed on the periphery of the main circuit board 13 and oriented in two directions. The image sensor 5 is a well-known device having numerous pixels for outputting an image signal by converting incident light photoelectrically. The signal processor 17 processes the image signal from the image sensor 5 for signal processing of initial amplification, gain control, A/D conversion and the like. Image data of a digital form is obtained is temporarily stored in an SDRAM (Synchronous Dynamic Random Access Memory) which is not shown. To display a live image (through image), the image data read out of the SDRAM is processed in image processing, transmitted to a control unit (not shown) in the portable electronic equipment, and displayed on a display panel (not shown) as a moving image. In case a release button (not shown) is depressed for imaging, the signal processor 17 processes the image for image processing of functions including matrix operation, signal interpolation, conversion into luminance and chrominance, data compression and the like. Then the image is stored in a memory (not shown) or storage medium by the control unit in the portable electronic equipment.

An angle sensor 20, a controller 21 and a driver 22 are mounted on the sub circuit board 14. The angle sensor 20 detects a camera shake of the portable electronic equipment including the camera module 2, and transmits a shift signal (shake signal) to the controller 21. An example of the angle sensor 20 is a three-axis gyrosensor having rotational axes in three directions perpendicular to one another, namely, X, Y and Z directions. Among those three, the Z direction is equal (parallel) to the optical axis direction OP. The three-axis gyrosensor is so mounted on the sub circuit board 14 that, in case the sub circuit board 14 becomes erected in parallel with the optical axis direction OP, one of the three axes of the angle sensor 20 extends in the Z direction. Thus, shift amounts of the X and Y directions perpendicular to the optical axis direction OP can be detected simultaneously even with one three-axis gyrosensor.

The controller 21, in consideration of shift signals from the angle sensor 20 in the X and Y directions (two-dimensional directions), obtains a target position as a destination of movement of the lens optics 7 for the purpose of correcting a shake in a plane perpendicular to the optical axis direction OP. The controller 21 inputs information of the obtained target position and information of a present position from a position sensor (not shown) to a feedback controller. An output signal is generated by the feedback controller, and sent to the driver 22. An anti-shake mechanism 35 or shake correction mechanism is driven by a drive signal from the driver 22, and moves the lens optics 7 in the X and Y directions to correct the shake. Examples of the position sensor are a Hall element, a photo sensor of a reflection type, and the like.

An auto focus mechanism 36 is driven by the driver 22 controlled by the controller 21, and performs a task of AF control at a lapse of a predetermined period or upon depression of a release button of the portable electronic equipment. In the AF control, the lens optics 7 are moved from the reference position, to obtain a contrast between adjacent pixels in a rangefinding area according to an image signal from the image sensor 5 in each of plural lens positions. The obtained contrast is integrated to obtain an AF evaluation value. One of the lens positions where the AF evaluation value is maximized is an in-focus position. Examples of a sensor for detecting the reference position of the lens optics 7 are a Hall element, a photo sensor of a reflection type, and the like.

The board holder 11 includes a holder body 25 of a plate shape, and support devices 26 and 27 (support projections) disposed to extend erectly from the holder body 25. The holder body 25 supports the main circuit board 13 in a plane perpendicular to the optical axis direction OP. The support devices 26 and 27 support the sub circuit board 14 on lines parallel with the optical axis direction OP. A recess cavity 25a is formed in a rear wall of the holder body 25. In case the main circuit board 13 is attached to the rear wall of the holder body 25 with screws or the like, the recess cavity 25a contains the image sensor 5 and the signal processor 17. An exposure opening 25b is formed in the center of the holder body 25 and aligned with the image sensor 5. A receiving shoulder 25c is formed around the exposure opening 25b. A glass cover 31 is fitted on the receiving shoulder 25c and attached thereto with adhesive agent. An example of the glass cover 31 is a IR cut filter for blocking infrared rays.

Lateral channels 28a, 28b and 28c are formed in the holder body 25 of the board holder 11 for receiving the flexible wiring board. Projections 29a and 29b are formed on a front wall of the holder body 25 for positioning. Two coupling claws 30a are formed on a lateral side of the holder body 25, and engaged with the coupling holes 4b in a removable manner upon fitting the front cover 4 on the digital imager 3. Also, two coupling claws are formed a second lateral side of the holder body 25 opposite to the coupling claws 30a for engagement with the front cover 4.

Shoulder recesses 26a and 27a are formed in the support devices 26 and 27 and receive edge portions of the sub circuit board 14. Sealing plates 32 and 33 are attached to the sub circuit board 14 and keep the sub circuit board 14 engaged with the shoulder recesses 26a and 27a without drop. The sealing plates 32 and 33 are coupled to the support devices 26 and 27 by use of adhesive agent, screws or the like. Note that a single sealing plate can be used, and can be disposed to extend with a large size from the support device 26 to the support device 27. Also, adhesive agent can be used to attach the sub circuit board 14 to the support devices 26 and 27.

Figure 4:
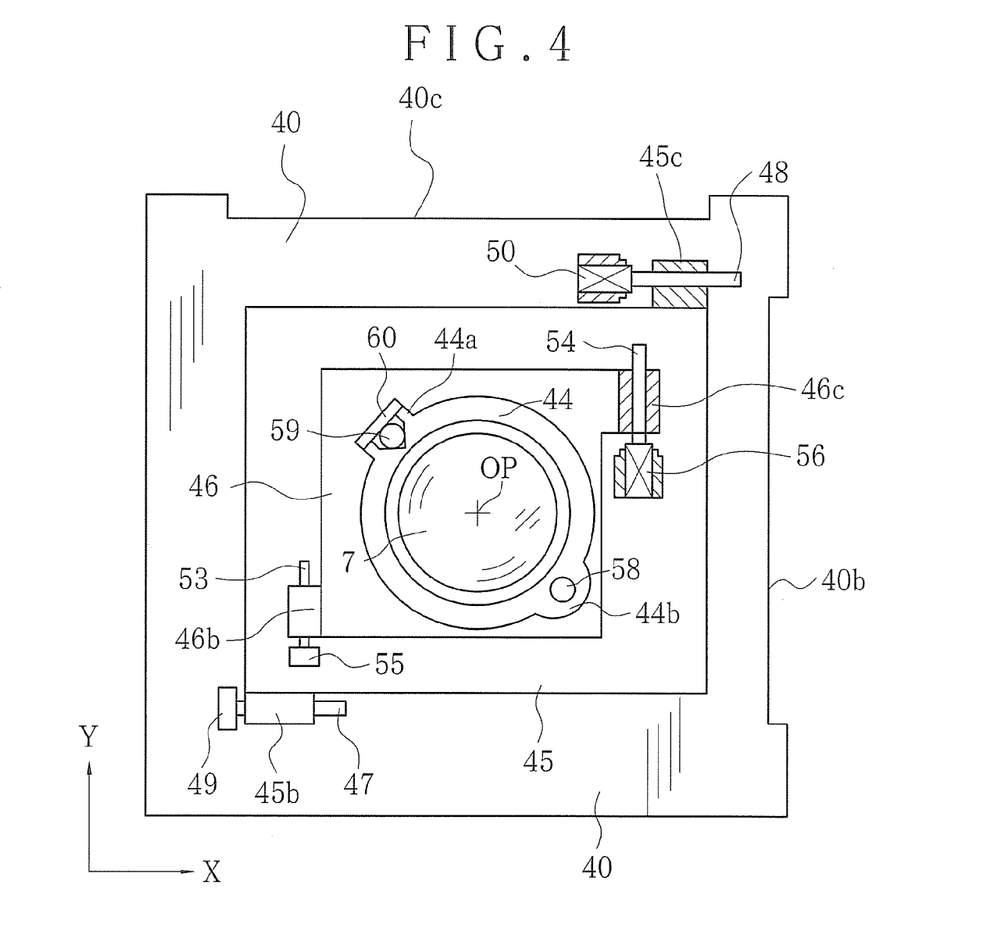
FIG. 4 is a plan illustrating a lens unit.

In FIGS. 2 and 4, the lens unit 8 includes the anti-shake mechanism 35, the auto focus mechanism 36, and a base frame 40, a lens structure 41 (lens optics), a light-tight housing 42 (light blocking cover) and a connecting board 43. The lens unit 8 is mounted on a front surface of the imaging unit 6. To this end, the base frame 40 of the lens unit 8 is placed on the board holder 11 of the imaging unit 6 and attached together by use of screws or the like. In FIG. 3, an optical aperture 40a or opening is formed in the center of the base frame 40. Lateral channels 40b and 40c are formed in lateral sides of the base frame 40.

In the lens structure 41, a lens barrel 44 contains the lens optics 7 having plural lens components (or plural lens groups). Note that the number of the lens components may vary according to image quality, and can be one lens element. The lens optics 7 focus an image of an object on an imaging surface of the image sensor 5.

The anti-shake mechanism 35 includes a movable frame 45 (frame plate) and a lens board 46 or second movable frame (frame plate). The movable frame 45 is movable in the X direction of the base frame 40. The lens board 46 is movable in the Y direction on the movable frame 45. Openings 45a and 46a are formed in the movable frame 45 and the lens board 46 for passing object light from the lens structure 41.

Receiving sleeves 45b and 45c are formed with the movable frame 45 along two side lines opposite to one another. A guide shaft 47 is disposed to extend in the X direction and received in the receiving sleeve 45b. A drive shaft 48 is received in the receiving sleeve 45c. The guide shaft 47 and the drive shaft 48 support the movable frame 45 movably in the X direction. A shaft bracket 49 is attached to the base frame 40, and supports the guide shaft 47 in a cantilever manner. A piezoelectric actuator 50 is disposed on the base frame 40. The drive shaft 48 constitutes an output shaft of the piezoelectric actuator 50.

The receiving sleeve 45b is a device having a circular hole for entry of the guide shaft 47. The receiving sleeve 45c includes a V-shaped groove and a spring plate. The V-shaped groove supports the drive shaft 48. The spring plate presses the drive shaft 48 to a surface of the V-shaped groove for sufficient friction in contact with the drive shaft 48. The piezoelectric actuator 50 extends and retracts the drive shaft 48 in its axial direction. A weight having large inertia is coupled with a rear end of a piezoelectric element of the piezoelectric actuator 50.

The piezoelectric actuator 50 is driven by a drive signal of a sawtooth waveform in such a manner that speed of the drive shaft 48 is different between states of extension and retraction. For example, the piezoelectric actuator 50 extends slowly for the purpose of moving the movable frame 45 forwards (to the right in FIG. 3), to move the drive shaft 48 forwards. The receiving sleeve 45c coupled with the drive shaft 48 frictionally is moved together with the drive shaft 48 forwards. In contrast, the piezoelectric actuator 50 retracts abruptly for the purpose of return, to move only the drive shaft 48 backwards in a state of leaving the movable frame 45 with inertia. According to this structure, the drive shaft 48 is driven back and forth to move the movable frame 45 forwards at plural fine steps. A present position of the movable frame 45 is detected by a position sensor (not shown) such as a Hall element. In the retraction of the movable frame 45, a drive signal with a waveform of a reverse direction is used. Note that an actuator for use can be a voice coil motor, stepping motor or the like in place of the piezoelectric actuator 50, for moving the movable frame 45.

Also, receiving sleeves 46b and 46c are formed with the lens board 46 on side lines opposite to one another. A guide shaft 53 is inserted in the receiving sleeve 46b and extends in the Y direction. A drive shaft 54 is inserted in the receiving sleeve 46c. The guide shaft 53 and the drive shaft 54 support the lens board 46 movably in the Y direction. The guide shaft 53 is supported by a shaft bracket 55 mounted on the movable frame 45. The drive shaft 54 is actuated by a piezoelectric actuator 56 mounted on the movable frame 45. The structures of the receiving sleeve 45c and the piezoelectric actuator 50 are repeated for the receiving sleeve 46c and the piezoelectric actuator 56.

The auto focus mechanism 36 includes receiving sleeves 44a and 44b, a guide shaft 58 and a drive shaft 59. The receiving sleeves 44a and 44b are formed with the lens barrel 44. The guide shaft 58 is attached to the lens board 46. The receiving sleeve 44a includes a V-shaped groove and a spring plate 60, which presses the drive shaft 59 into the groove. A piezoelectric actuator 61 is mounted on the lens board 46. An end of the drive shaft 59 is connected with the piezoelectric actuator 61. The piezoelectric actuator 61 is driven to move the lens barrel 44 in the forward or backward direction at a fine step.

The light-tight housing 42 of the box shape is mounted on the base frame 40 and contains the lens structure 41, the anti-shake mechanism 35 and the auto focus mechanism 36 in a light-tight manner. A lens opening 42a is formed in the light-tight housing 42 and aligned with the lens optics 7. A shutter mechanism 64 is disposed inside the light-tight housing 42 for opening and closing of the lens opening 42a.

The shutter mechanism 64 includes a shutter blade 65 and a shutter actuator 66. The shutter blade 65 opens and closes the lens opening 42a. The shutter actuator 66 moves the shutter blade 65 back and forth for opening/closing operation.

Figure 5:
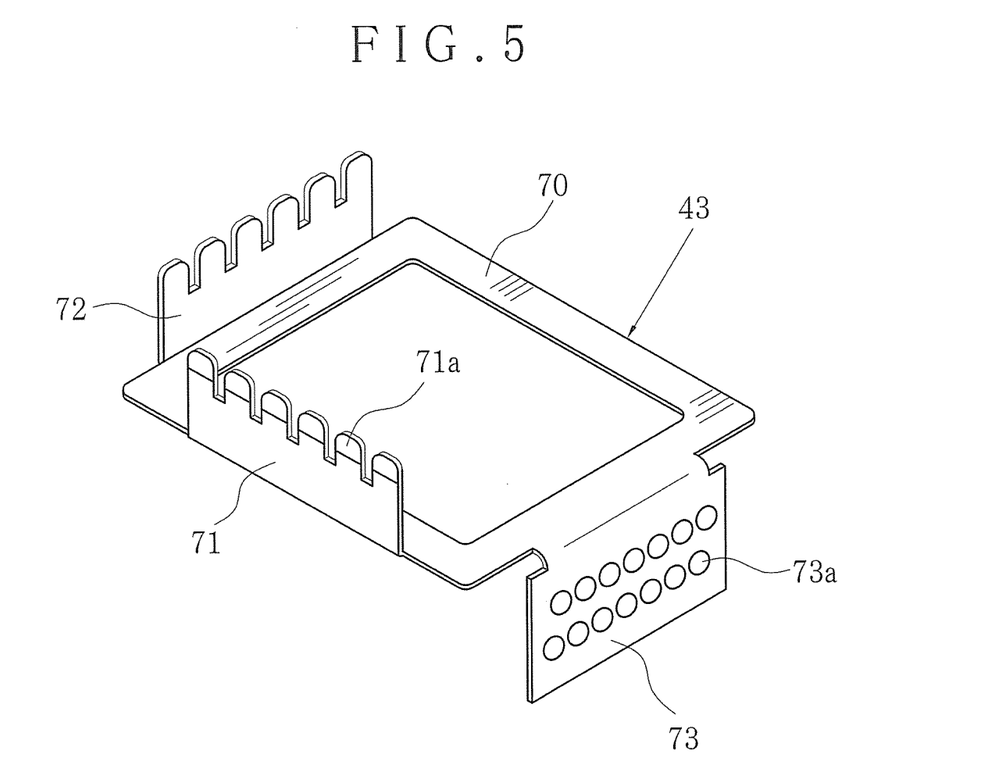
FIG. 5 is a bottom perspective view illustrating a connecting board.

In FIGS. 3 and 5, the connecting board 43 connects the anti-shake mechanism 35 and the auto focus mechanism 36 to the wiring board device 10. An example of the connecting board 43 is a flexible wiring board. The connecting board 43 includes a frame-shaped support 70, lug projections 71 and 72 or bend portions, and a test pad structure 73. The frame-shaped support 70 is disposed on the periphery of the main circuit board 13. The lug projections 71 and 72 project backwards vertically. The test pad structure 73 projects forwards in a vertically bent form. Various elements are coupled with the frame-shaped support 70, including the piezoelectric actuators 50, 56 and 61, a first position sensor for detecting a present position of the movable frame 45 in the X direction, a second position sensor for detecting a present position of the lens board 46 in the Y direction, a position sensor for detecting the reference position of the lens barrel 44, and the like.

The lug projections 71 extend through the lateral channel 40b of the base frame 40 and the lateral channel 28c of the board holder 11, and come to the main circuit board 13. Plural contacts 71a are formed with distal ends of the lug projections 71. There is solder 74 for electrically coupling the contacts 71a to the contact group 18 of the main circuit board 13. Also, the lug projections 72 extend through the lateral channels 28b and 40c. Contacts (not shown) of distal ends of the lug projections 72 are electrically coupled to the contact group 19 by soldering. Consequently, the lug projections 71 and 72 connect the connecting board 43 to the main circuit board 13.

The test pad structure 73 is used for testing operation of the auto focus mechanism 36 and the anti-shake mechanism 35 at the time of assembling the camera module 2. Plural test pad areas 73a are disposed in the test pad structure 73. A test probe of a testing apparatus is coupled with the test pad areas 73a before attaching the lug projections 71 and 72 to the main circuit board 13 by soldering.

As the test pad structure 73 is overlapped on an area of the main circuit board 13, the camera module 2 can be constructed compactly in comparison with a disposition of the test pad structure 73 protruding laterally from the digital imager 3 on an extension of the main circuit board 13.

The operation of assembling the imaging unit 6 is described now. The holder body 25 of the board holder 11 is placed on the main circuit board 13. A center of the exposure opening 25b is aligned with the center of the image sensor 5, before the holder body 25 is attached to the main circuit board 13 by use of screws. The sub circuit board 14 is curved so as to enter the lateral channel 28a of the holder body 25 of the board holder 11, and fitted in the shoulder recesses 26a and 27a of the support devices 26 and 27. The sealing plates 32 and 33 are attached to the support devices 26 and 27 with adhesive agent or screws to prevent the sub circuit board 14 on the shoulder recesses 26a and 27a from dropping. The main circuit board 13 is kept on the holder body 25. The sub circuit board 14 is supported on the support devices 26 and 27 in a state perpendicular to the main circuit board 13 and parallel with the optical axis direction OP.

As the sub circuit board 14 is supported on the support devices 26 and 27 in parallel with the optical axis direction OP, the angle sensor 20 is fixed in a suitable position and maintained in a stable state. For example, the angle sensor 20 can be a three-axis gyrosensor. A first axis of the angle sensor 20 is parallel with the optical axis direction OP. Second and third axes of the angle sensor 20 are parallel with the X and Y directions. A camera shake of the camera module 2 in the X and Y directions can be detected correctly.

As the sub circuit board 14 is disposed in parallel with the optical axis direction OP, a space in the camera can be saved around the optical axis direction OP. A size of the camera module 2 can be small without enlargement. Also, the support devices 26 and 27 support the edge portions of the sub circuit board 14, so that thickness of circuit devices mounted on the sub circuit board 14 does not cause enlargement of the size of the camera module 2. Only the two edge portions of the sub circuit board 14 are supported. Thus, dissipation of heat can be efficient even from the circuit devices such as the driver 22. The signal processor 17 on the main circuit board 13 is separate from the driver 22 of the sub circuit board 14. It is possible to remove influence of radio waves from the driver 22 to the signal processor 17 as electric noise.

The lens unit 8 assembled by a separate process is mounted on the imaging unit 6, to produce the digital imager 3. The optical axes of the lens unit 8 and the imaging unit 6 are aligned with one another by positioning of two edges of the base frame 40 on the projections 29*a* and 29*b* of the board holder 11. After the positioning, the base frame 40 is attached to the board holder 11 with screws or the like. After assembling the digital imager 3, the sub circuit board 14 becomes opposed to a lateral surface of the light-tight housing 42. The angle sensor 20, the controller 21 and the driver 22 are disposed in a space between the sub circuit board 14 and the light-tight housing 42.

Then the test probe is coupled with the test pad structure 73 of the connecting board 43, to connect the connecting board 43 to a testing apparatus. The anti-shake mechanism 35 and the auto focus mechanism 36 are experimentally operated by the testing apparatus for checking normal operation. After this, the test probe is removed from the test pad structure 73. The lug projections 71 and 72 of the connecting board 43 are attached to the main circuit board 13 by soldering, to connect the connecting board 43 to the wiring board device 10. Finally, the front cover 4 is placed to cover the digital imager 3. The coupling holes 4*b* of the front cover 4 are coupled with the coupling claws 30*a* of the board holder 11. As the front cover 4 covers the sub circuit board 14, it is possible to remove electromagnetic influence from the driver 22 to circuit devices in the portable electronic equipment.

The camera module 2 is mounted in the portable electronic equipment and operates for photographing. In the imaging mode, the controller 21 controls the driver 22 to drive the shutter actuator 66. The lens opening 42*a* is opened at a size according to object brightness by actuating the shutter blade 65. The image sensor 5 converts object light from the lens structure 41 photoelectrically, and outputs an image signal. The image signal is processed by the signal processor 17 for signal processing, and transmitted by the connection terminal 15 to the portable electronic equipment, of which a display panel displays a live image (through image).

In case a release button of the portable electronic equipment is manipulated, the controller 21 causes the driver 22 to input a drive signal to the auto focus mechanism 36. The piezoelectric actuator 61 of the auto focus mechanism 36 moves the drive shaft 59 back and forth upon receiving the drive signal, and moves the lens barrel 44 from the reference position. During the movement of the lens barrel 44, the controller 21 obtains an AF evaluation value according to an image signal from the image sensor 5. The lens barrel 44 is moved to a lens position where the AF evaluation value is maximized for the purpose of focusing. Even while the live image is displayed, the focusing is performed at a lapse of predetermined time.

After the focusing, the image sensor 5 starts photoelectric conversion. Upon the lapse of exposure time obtained by the signal processor 17, the shutter actuator 66 closes the shutter blade 65 to close the lens opening 42*a*. After the lens opening 42*a* is closed, an image signal is read out from the image sensor 5. The image signal is processed by the signal processor 17 for signal processing, and stored in a memory in the portable electronic equipment as a still image. Then the shutter blade 65 is opened again to start forming a live image.

Assuming that a camera shake occurs during imaging of a still image, a shift signal is generated by the angle sensor 20 and input to the controller 21. The controller 21 obtains a target position in the X and Y directions for moving to compensate for the camera shake. The signal of the target position and a signal of the present position of the movable frame 45 and the lens board 46 measured by the position sensors are controlled in the feedback control, to obtain shake correction signals in the X and Y directions. The shake correction signals are converted by the driver 22 into drive signals, which are input to the anti-shake mechanism 35. The piezoelectric actuators 50 and 56 are driven in the anti-shake mechanism 35 with the drive signals of the X and Y directions. The movable frame 45 and the lens board 46 are moved in a plane perpendicular to the optical axis direction OP. The lens barrel 44 is moved in reverse to the camera shake to compensate for the camera shake.

Figure 6:
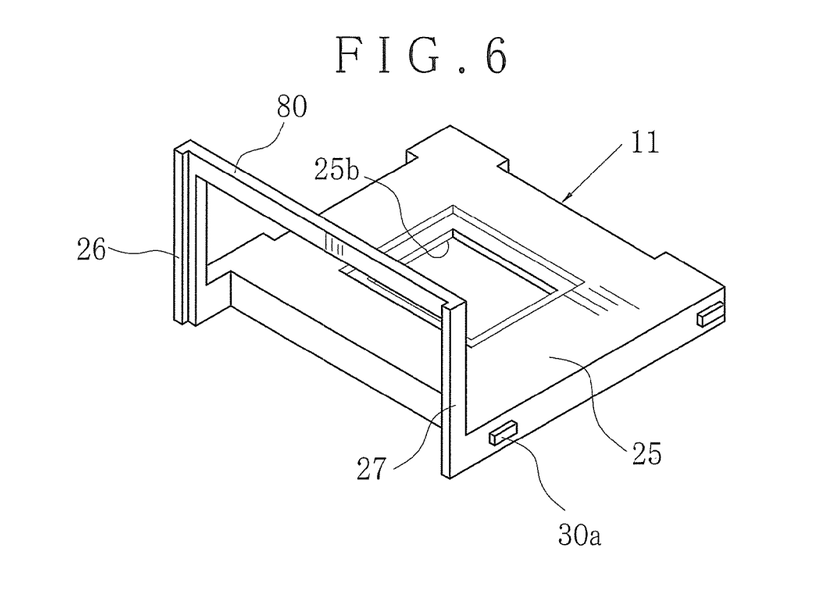
FIG. 6 is a perspective view illustrating another preferred board holder for a camera module with a crossbar portion.

In FIG. 6, another preferred embodiment of the board holder 11 is illustrated. A crossbar portion 80 connects front end portions of the support devices 26 and 27 together to support a front portion of the sub circuit board 14. The sub circuit board 14 is supported by the support devices 26 and 27 and the crossbar portion 80 on two side lines parallel with the optical axis direction OP and on one side line perpendicular with the optical axis direction OP. It is possible more stably to support the sub circuit board 14 than with only the support devices 26 and 27, so as to increase precision in correction of a camera shake. Note that the crossbar portion 80 can be disposed in other positions in relation to the support devices 26 and 27, for example, at a rear end portion of the support devices 26 and 27 in relation to the optical axis direction OP.

Figure 7:
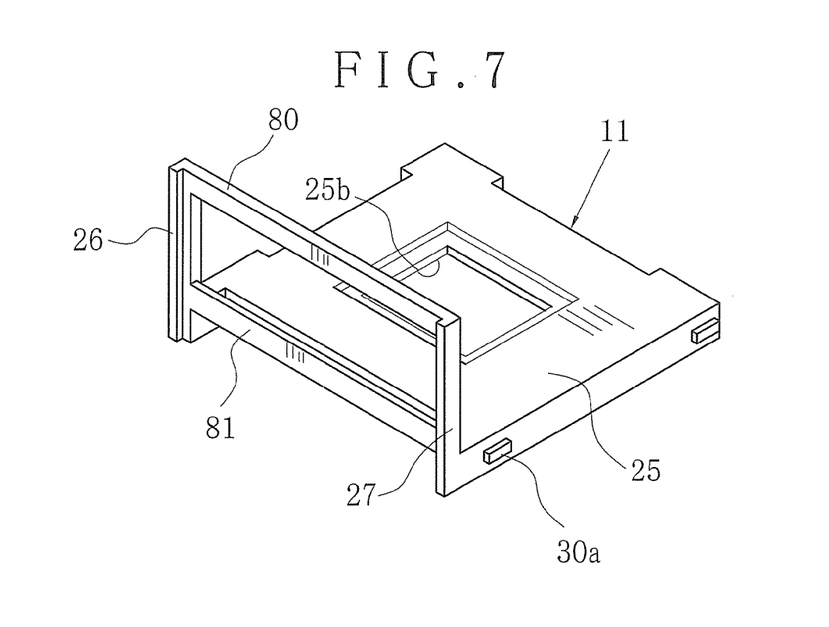
FIG. 7 is a perspective view illustrating still another preferred board holder with two crossbar portions.

In FIG. 7, another preferred embodiment is illustrated, in which a second crossbar portion 81 is disposed under the crossbar portion 80 between the support devices 26 and 27. Both of the two edge portions perpendicular to the optical axis direction OP can be supported by the crossbar portions 80 and 81. The sub circuit board 14 can be supported still more stably.

In a structure of using a voice coil motor in the lens barrel 44 for the AF control, the lens barrel 44 is supported in a movable manner in the optical axis direction and the direction perpendicular with the optical axis direction by use of a spring or the like. A first coil and a first magnet for the AF control and a second coil and a second magnet for the camera shake correction are disposed. A current is drawn to flow through the first and second coils. Electromagnetic force is generated by the first and second magnets, and can drive the lens barrel 44 for moving in the optical axis direction and in a direction perpendicular therewith.

In the above embodiment, the test pad structure 73 is disposed on a side adjacent with a side of the sub circuit board 14. However, the test pad structure 73 can be disposed on a side opposite to the sub circuit board 14. In the above embodiment, the shoulder recesses 26a and 27a are formed in the support devices 26 and 27. However, grooves can be formed in the support devices 26 and 27 in place of the shoulder recesses 26a and 27a. This makes it unnecessary to use the sealing plates 32 and 33.

The camera module of the invention is incorporated in the portable electronic equipment, for example, mobile telephone and a tablet. The optical axis direction OP, namely the Z direction is the forward direction toward and object to be photographed. In the camera module of the invention, the X and Y directions can be any of upward and downward directions and rightward and leftward directions. For example, a direction of extending the flexible wiring board 12 can be the downward direction of the mobile telephone. A side of the test pad structure 73 can be a right side as viewed from a user of the mobile telephone. In short, the X direction can be the downward direction, and the Y direction can be the rightward direction.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera module comprising:
   a lens structure, having lens optics, for focusing object light from an object;
   an image sensor for detecting said object light from said lens optics, to photograph an image;
   an anti-shake mechanism for correcting a camera shake by moving said lens structure two-dimensionally in a plane perpendicular to an optical axis direction of said lens optics;
   a first circuit board, having said image sensor mounted thereon, electrically connected with said anti-shake mechanism;
   an angle sensor for detecting said camera shake;
   a second circuit board, connected with said first circuit board, having said angle sensor mounted thereon;
   a holder body for supporting said first circuit board in a plane perpendicular to said optical axis direction;
   two support devices, disposed to extend from said holder body in said optical axis direction, for supporting edges of said second circuit board on a lateral side of said lens structure; and
   a first crossbar portion, disposed to extend between front end portions of said two support devices, for supporting a front portion of said second circuit board.

2. The camera module as defined in claim 1, further comprising a second crossbar portion, disposed to extend between intermediate portions of said two support devices, for supporting an intermediate portion of said second circuit board.

3. The camera module as defined in claim 1, wherein said second circuit board includes a driver for transmitting a drive signal to said anti-shake mechanism.

4. The camera module as defined in claim 1, further comprising an exposure opening, formed in said holder body, for entry of said object light to said image sensor, wherein said holder body has a rear surface where said first circuit board is supported.

5. The camera module as defined in claim 4, further comprising a glass cover for covering said exposure opening.

6. The camera module as defined in claim 1, wherein said first circuit board is coupled with an intermediate portion of a flexible wiring board, and said second circuit board is coupled with a distal end portion of said flexible wiring board, to constitute a wiring board device.

7. The camera module as defined in claim 6, further comprising:
   a connecting board, disposed along said first circuit board, having a contact connected with said first circuit board, for electric connection between said anti-shake mechanism and said first circuit board; and
   a test pad structure, formed on said connecting board, connectable with a testing apparatus, for testing said anti-shake mechanism.

8. The camera module as defined in claim 7, wherein said lens structure, said anti-shake mechanism and said connecting board constitute a lens unit;
   said holder body and said first and second circuit boards constitute an imaging unit, and said lens unit is mounted on said imaging unit.

9. The camera module as defined in claim 8, further comprising:
   a light-tight housing of a box shape for containing said lens unit and said imaging unit at least partially, wherein said second circuit board and said test pad structure are disposed on a periphery of said light-tight housing; and
   a lens opening formed in said light-tight housing and aligned with said lens optics.

10. The camera module as defined in claim 9, further comprising:
    a front cover for covering said light-tight housing, said second circuit board and said test pad structure; and
    an opening, formed in said front cover, for passing said object light to said lens optics.

11. The camera module as defined in claim 10, wherein said angle sensor includes a three-axis gyrosensor, having three rotational axes perpendicular to each other, wherein one of said rotational axes being aligned with said optical axis direction, said three-axis gyrosensor detecting movement in directions of two of said rotational axes perpendicular to said optical axis direction.

12. A camera module comprising:
    a lens structure, having lens optics, for focusing object light from an object;
    an image sensor for detecting said object light from said lens optics, to photograph an image;
    an anti-shake mechanism for correcting a camera shake by moving said lens structure two-dimensionally in a plane perpendicular to an optical axis direction of said lens optics;
    a first circuit board, having said image sensor mounted thereon, electrically connected with said anti-shake mechanism;
    an angle sensor for detecting said camera shake;
    a second circuit board, connected with said first circuit board, having said angle sensor mounted thereon;
    a holder for supporting said first circuit board in a plane perpendicular to said optical axis direction, and supporting said second circuit board along said optical axis direction on a lateral side of said lens structure;
    a flexible wiring board, having an intermediate portion with which said first circuit board is coupled, having a distal end portion with which said second circuit board is coupled, for constituting a wiring board device;

a connecting board, disposed along said first circuit board, having a contact connected with said first circuit board, for electric connection between said anti-shake mechanism and said first circuit board; and a test pad structure, formed on said connecting board, connectable with a testing apparatus, for testing said anti-shake mechanism.

13. The camera module as defined in claim 12, wherein said lens structure, said anti-shake mechanism and said connecting board constitute a lens unit;

said holder and said first and second circuit boards constitute an imaging unit, and said lens unit is mounted on said imaging unit.

14. The camera module as defined in claim 13, further comprising:

a light-tight housing of a box shape for containing said lens unit and said imaging unit at least partially, wherein said second circuit board and said test pad structure are disposed on a periphery of said light-tight housing;

a lens opening formed in said light-tight housing and aligned with said lens optics.

15. The camera module as defined in claim 14, further comprising:

a front cover for covering said light-tight housing, said second circuit board and said test pad structure; and an opening, formed in said front cover, for passing said object light to said lens optics.

16. The camera module as defined in claim 15, wherein said angle sensor includes a three-axis gyrosensor, having three rotational axes perpendicular to each other, wherein one of said rotational axes being aligned with said optical axis direction, said three-axis gyrosensor detecting movement in directions of two of said rotational axes perpendicular to said optical axis direction.

* * * * *